(12) United States Patent
Taniguchi et al.

(10) Patent No.: US 12,227,114 B2
(45) Date of Patent: Feb. 18, 2025

(54) SLIDING DEVICE

(71) Applicants: TOYOTA BOSHOKU KABUSHIKI KAISHA, Aichi (JP); TACHI-S CO., LTD., Tokyo (JP); TF-METAL Co., Ltd., Shizuoka (JP)

(72) Inventors: Kosuke Taniguchi, Aichi (JP); Shunsuke Kuroda, Shizuoka (JP)

(73) Assignees: TOYOTA BOSHOKU KABUSHIKI KAISHA, Aichi (JP); TACHI-S CO., LTD., Tokyo (JP); TF-METAL CO., LTD., Shizuoka (JP)

( * ) Notice: Subject to any disclaimer, the term of this patent is extended or adjusted under 35 U.S.C. 154(b) by 0 days.

(21) Appl. No.: 17/669,772

(22) Filed: Feb. 11, 2022

(65) Prior Publication Data

US 2022/0266726 A1 Aug. 25, 2022

(30) Foreign Application Priority Data

Feb. 19, 2021 (JP) ................... 2021-025454

(51) Int. Cl.
*B60N 2/08* (2006.01)

(52) U.S. Cl.
CPC ......... *B60N 2/0818* (2013.01); *B60N 2/0875* (2013.01)

(58) Field of Classification Search
CPC .. B60N 2/0705; B60N 2/0812; B60N 2/0818; B60N 2/0831; B60N 2/085;
(Continued)

(56) References Cited

U.S. PATENT DOCUMENTS 5,874,748 A * 2/1999 Osawa ............... H01L 25/0753
257/E33.072
6,079,688 A * 6/2000 Levillain ............ B60N 2/0818
248/429

(Continued)

FOREIGN PATENT DOCUMENTS

JP 2013052839 A 3/2013
JP 2019-156032 A 9/2019

OTHER PUBLICATIONS

Dictionary.com, Below Definition & Meaning, Retrieved May 30, 2024, https://www.dictionary.com/browse/below. (Year: 2024).*

(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

A sliding device that slidably supports a seat body of a vehicle seat is provided. The sliding device includes: a fixed rail; a movable rail; a locking member displaceable between a locking position and an unlocking position, a sliding movement of the movable rail being restricted in the locking position, and restriction of the sliding movement being released in the unlocking position; a retention spring configured to apply to the locking member a retaining force to retain the locking member in the locking position; a release lever configured to displace the locking member to the unlocking position; a return spring configured to apply to the release lever an elastic force to return the release lever to its initial position; and a restrictor configured to restrict a displacement of the release lever.

12 Claims, 13 Drawing Sheets

(58) Field of Classification Search
CPC .. B60N 2/0862; B60N 2/0875; B60N 2/0881; B60N 2/0887
See application file for complete search history.

(56) References Cited

U.S. PATENT DOCUMENTS

| | | | | |
|---|---|---|---|---|
| 6,926,443 | B2 * | 8/2005 | Niimi | B60N 2/0705 384/34 |
| 7,229,117 | B2 * | 6/2007 | Okuda | B60N 2/3011 296/65.09 |
| 8,770,534 | B2 * | 7/2014 | Nakamura | B60N 2/0818 296/65.13 |
| 8,925,889 | B2 * | 1/2015 | Nagura | B60N 2/0725 296/65.13 |
| 9,327,615 | B2 * | 5/2016 | Yamada | F16C 29/043 |
| 9,566,878 | B2 * | 2/2017 | Couasnon | B60N 2/0715 |
| 9,764,771 | B1 * | 9/2017 | Hiwatashi | B62D 25/081 |
| 9,827,877 | B2 * | 11/2017 | Jähner | B60N 2/0818 |
| 10,272,802 | B2 * | 4/2019 | Matsufuji | B60N 2/0806 |
| 10,933,772 | B2 * | 3/2021 | Sprenger | B60N 2/0705 |
| 11,110,825 | B2 * | 9/2021 | Taniguchi | B60N 2/0705 |
| 11,180,054 | B2 * | 11/2021 | Taniguchi | B60N 2/0818 |
| 11,192,472 | B2 * | 12/2021 | Taniguchi | B60N 2/0727 |
| 12,059,981 | B2 * | 8/2024 | Taniguchi | B60N 2/0705 |
| 2022/0266726 | A1 * | 8/2022 | Taniguchi | B60N 2/085 |

OTHER PUBLICATIONS

Japanese Office Action in corresponding application No. JP2021-025454, dated Mar. 12, 2024 (and English translation).

* cited by examiner

SLIDING DEVICE

CROSS-REFERENCE TO RELATED APPLICATIONS

This application claims the benefit of Japanese Patent Application No. 2021-025454 filed on Feb. 19, 2021 with the Japan Patent Office, the entire disclosure of which is incorporated herein by reference.

BACKGROUND

The present disclosure relates to a sliding device that slidably supports a seat body of a vehicle seat.

As disclosed in Japanese Unexamined Patent Application Publication No. 2019-156032, a sliding device comprises a fixed rail, a movable rail, a locking member, a release lever, and a spring. The movable rail is a slidable member to which a seat body is secured. The locking member restricts a sliding movement of the movable rail.

The release lever is operated by a user, such as an occupant, and is used to displace the locking member to an unlocking position. The spring provides a retaining force to retain the release lever in its initial position. In the sliding device of the aforementioned patent document, the spring and the locking member are integrated.

SUMMARY

When a large force is applied to the release lever, the locking member may be displaced and may not be able to restrict the sliding displacement of the movable rail. In one aspect of the present disclosure, it is preferable to be able to restrict the sliding displacement of the movable rail at all times.

It is desirable that a sliding device that slidably supports a seat body of a vehicle seat comprises at least one of the following constituent features, for example.

The constituent features include: a fixed rail fixed to a vehicle; a movable rail slidably attached to the fixed rail and to which the seat body is secured; a locking member displaceable between a locking position and an unlocking position, a sliding movement of the movable rail being restricted in the locking position, and restriction of the sliding movement being released in the unlocking position; a retention spring configured to apply to the locking member a retaining force to retain the locking member in the locking position; a release lever configured to displace the locking member to the unlocking position, the release lever extending toward the locking member substantially along a longitudinal direction of the movable rail, and the release lever being pivotally displaceable between a release position and an initial position, the release position being a position for pressing the locking member to displace the locking member to the unlocking position, and the initial position being a position for displacing the locking member to the locking position; a return spring configured to retain the release lever in the initial position and apply to the release lever an elastic force to return the release lever located in the release position to the initial position; and a restrictor configured to restrict a displacement of the release lever in excess of a predefined length in a direction substantially parallel to the longitudinal direction of the movable rail, which is a direction toward the locking member (hereinafter, referred to as load direction).

With the above configuration, a large displacement of the release lever in the load direction is inhibited in the sliding device. Accordingly, a displacement of the locking member from the locking position to the unlocking position due to the large displacement of the release lever in the load direction can be inhibited.

According to the sliding device, even if a large force in the load direction is applied to the release lever, the displacement of the locking member from the locking position to the unlocking position can be inhibited.

Also, an assembly worker or an assembly robot (hereinafter, referred to as operator) can be restricted from inserting the release lever in the load direction more than necessary during an assembly of the sliding device. Accordingly, assembly failure of the sliding device can be inhibited.

The sliding device may be configured as follows, for example.

It is desirable that the restrictor is formed into a protrusion protruding from an inner wall surface of the movable rail.

Desirably, the restrictor is provided in a position spaced apart from a leading end of the release lever, and, when the release lever is displaced in the load direction, the restrictor contacts the leading end of the release lever to restrict the displacement of the release lever.

This can inhibit the release lever from interfering with the restrictor when the release lever pivots, in other words, when a user operates the release lever.

It is effective that the sliding device is employed in a configuration in which part of the retention spring is located in a position displaced from the restrictor in the load direction and facing the leading end of the release lever.

It is desirable that the sliding device comprises: a locked portion provided on the return spring and locked to the release lever; and a support portion provided on the movable rail and configured to contact the release lever from an opposite side of the locked portion relative to the release lever to form a pivot center of the release lever, wherein the locked portion is configured to apply to the release lever an elastic force to return the release lever to the initial position, and restrict the displacement of the release lever in the load direction.

It is desirable that a length from the support portion to the restrictor is larger than a length from the support portion to the leading end of the release lever. This can reliably inhibit the release lever from interfering with the restrictor when the release lever pivots, in other words, when the user operates the release lever.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
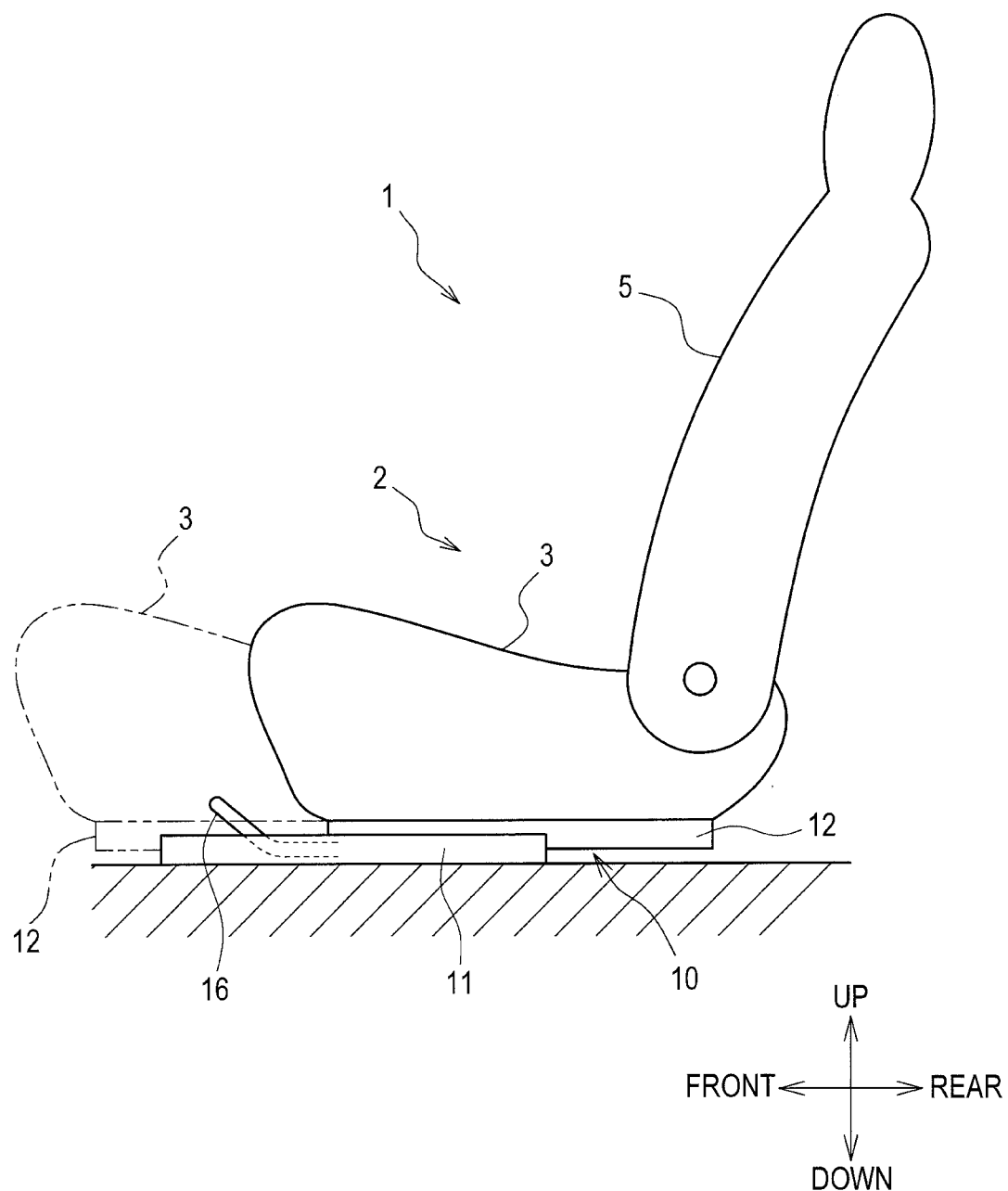
FIG. 1 is a diagram showing a vehicle seat of a first embodiment.

An "embodiment" hereinafter shows one example of embodiments that belong to the technical scope of the present disclosure.

The present embodiments relate to a sliding device in a seat mounted on a vehicle such as an automobile (hereinafter, referred to as vehicle seat). Directions in the drawings are defined in relation to the vehicle seat of the present embodiments that is assembled to an automobile.

Arrows, diagonal lines, and other marks that indicate directions in the drawings are made for easy understanding of relationships between the drawings and for easy understanding of shapes of members or portions in the drawings. The sliding device should not be limited by directions in the drawings. Drawings including diagonal lines are not necessarily cross-sectional views.

At least in respect of a member or portion that is labeled with a reference numeral for explanations, there is at least one in number of such a member or portion unless the number is otherwise specified as "only one of" or the like. In other words, there may be two or more of such a member or portion when the number is not specified as "only one of" or the like. The vehicle seat of the present disclosure comprises at least constituent elements, such as members or portions described with reference numerals.

First Embodiment

1. Overview of Vehicle Seat (See FIG. 1)

A vehicle seat 1 of the present embodiment comprises two sliding devices 10 and a seat body 2. The seat body 2 comprises a seat cushion 3 and a seatback 5.

The seat cushion 3 supports buttocks of an occupant. The seatback 5 supports a back of the occupant. The sliding devices 10 each slidably support the seat body 2 of the vehicle seat 1.

The seat body 2 is slidably supported by the two sliding devices 10. Specifically, the first sliding device 10 supports one end of the seat body 2 in a seat-width direction. The second sliding device 10 supports the other end of the seat body 2 in the seat-width direction.

2. Configuration of Sliding Device

2.1 Overview of Sliding Device

Figure 2:
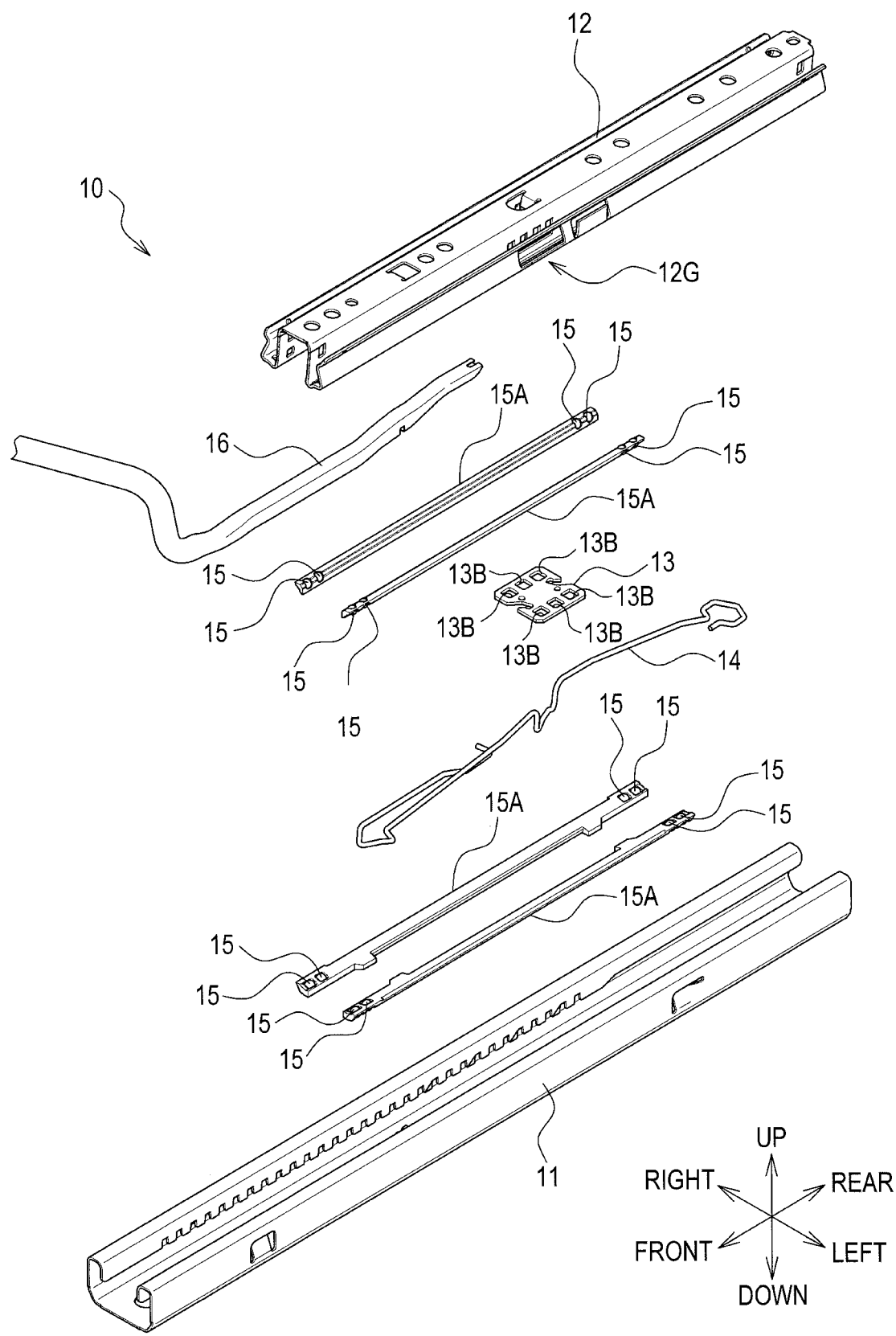
FIG. 2 is an exploded view of a sliding device of the first embodiment.

The two sliding devices 10 have an identical structure in the present embodiment. The following description explains the sliding device 10 arranged at a left end in the seat-width direction. As shown in FIG. 2, the sliding device 10 comprises a fixed rail 11, a movable rail 12, a lock plate 13, a spring member 14, and a release lever 16. The release lever 16 includes a front end configured to be operated by a user and a rear end located opposite the front end.

<Fixed Rail, Movable Rail and the Like>

The fixed rail 11 is directly or indirectly secured to a vehicle. The seat body 2 is secured to the movable rail 12, and the movable rail 12 is slidable relative to the fixed rail 11.

Figure 4:
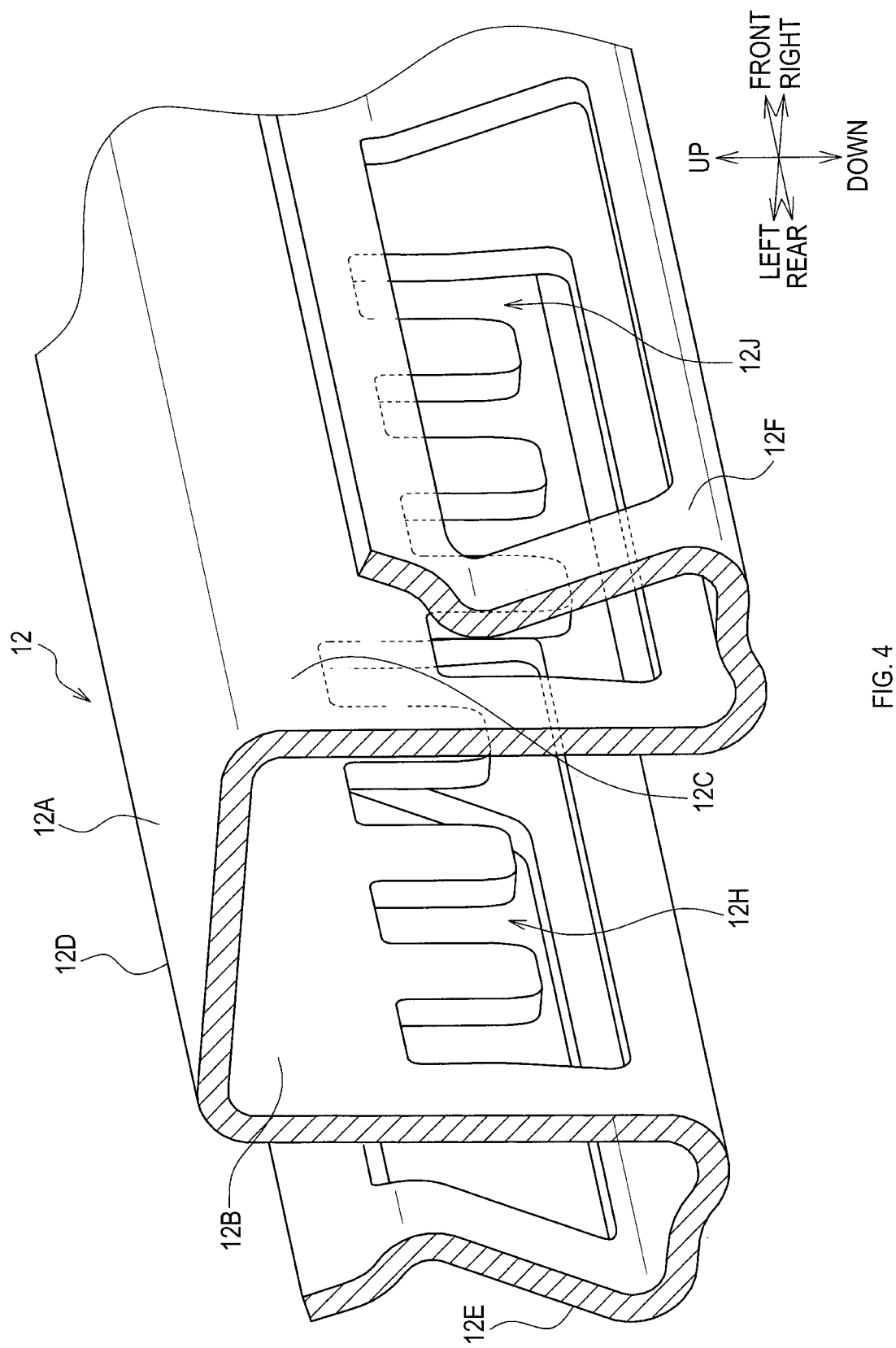
FIG. 4 is a diagram showing a movable rail of the first embodiment.

As shown in FIG. 4, the movable rail 12 comprises a top panel 12A and two side panels 12B, 12C. The top panel 12A is a strip-shaped portion to which the seat body 2 is secured.

The two side panels 12B, 12C are strip-shaped portions respectively provided on one end and the other end of the top panel 12A in a width direction thereof and facing each other. The top panel 12A and the two side panels 12B, 12C form a rail body 12D. In other words, a cross-section of the rail body 12D orthogonal to a longitudinal direction thereof has a substantially U-shape with its upper side closed.

The rail body 12D is a one-piece article in which the top panel 12A and the two side panels 12B, 12C are formed by plastic working of a metal plate such as a cold rolled steel sheet. Track portions 12E, 12F are respectively provided on one end and the other end of the rail body 12D in a width direction thereof.

The track portions 12E, 12F are in rolling contact with steel balls 15 shown in FIG. 2. The movable rail 12 is supported by the fixed rail 11 via the steel balls 15. The steel balls 15 are one example of rolling elements.

Retainers 15A restrict the respective steel balls 15 from moving relative to the movable rail 12. As a result, the steel balls 15 can be in rolling contact with the movable rail 12 and the fixed rail 11 without moving relative to the movable rail 12. Thus, the movable rail 12 can slide relative to the fixed rail 11.

Figure 3:
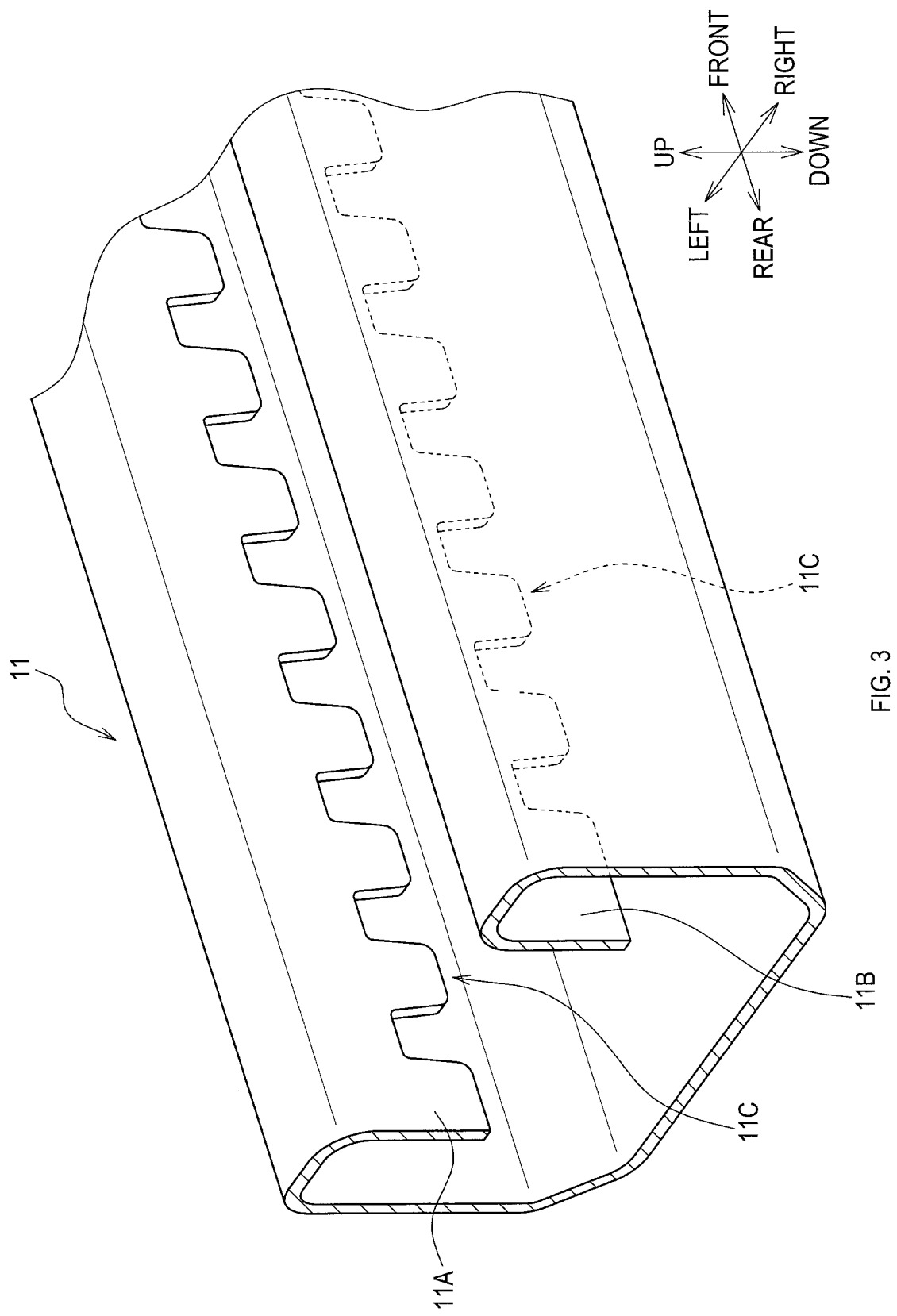
FIG. 3 is a diagram showing a fixed rail of the first embodiment.

As shown in FIG. 3, comb portions 11C are provided at respective portions 11A, 11B of the fixed rail 11. Each comb portion 11C has protrusions and recesses alternately provided in series along a longitudinal direction of the fixed rail 11. The portions 11A, 11B are strip-shaped portions facing the side panels 12B, 12C of the movable rail 12.

The side panels 12B, 12C respectively include comb portions 12H, 12J shown in FIG. 4 in a longitudinally intermediate part 12G (see FIG. 2) of the movable rail 12. Each of the comb portions 12H, 12J has protrusions and recesses alternately provided in series along a longitudinal direction of the movable rail 12.

The protrusions of the comb portions 11C and the comb portions 12H, 12J protrude downward. In other words, the recesses of the comb portions 11C and the comb portions 12H, 12J have open bottoms. Regions with the comb portions 11C are greater than regions with the comb portions 12H, 12J.

<Lock Plate>

Figure 5:
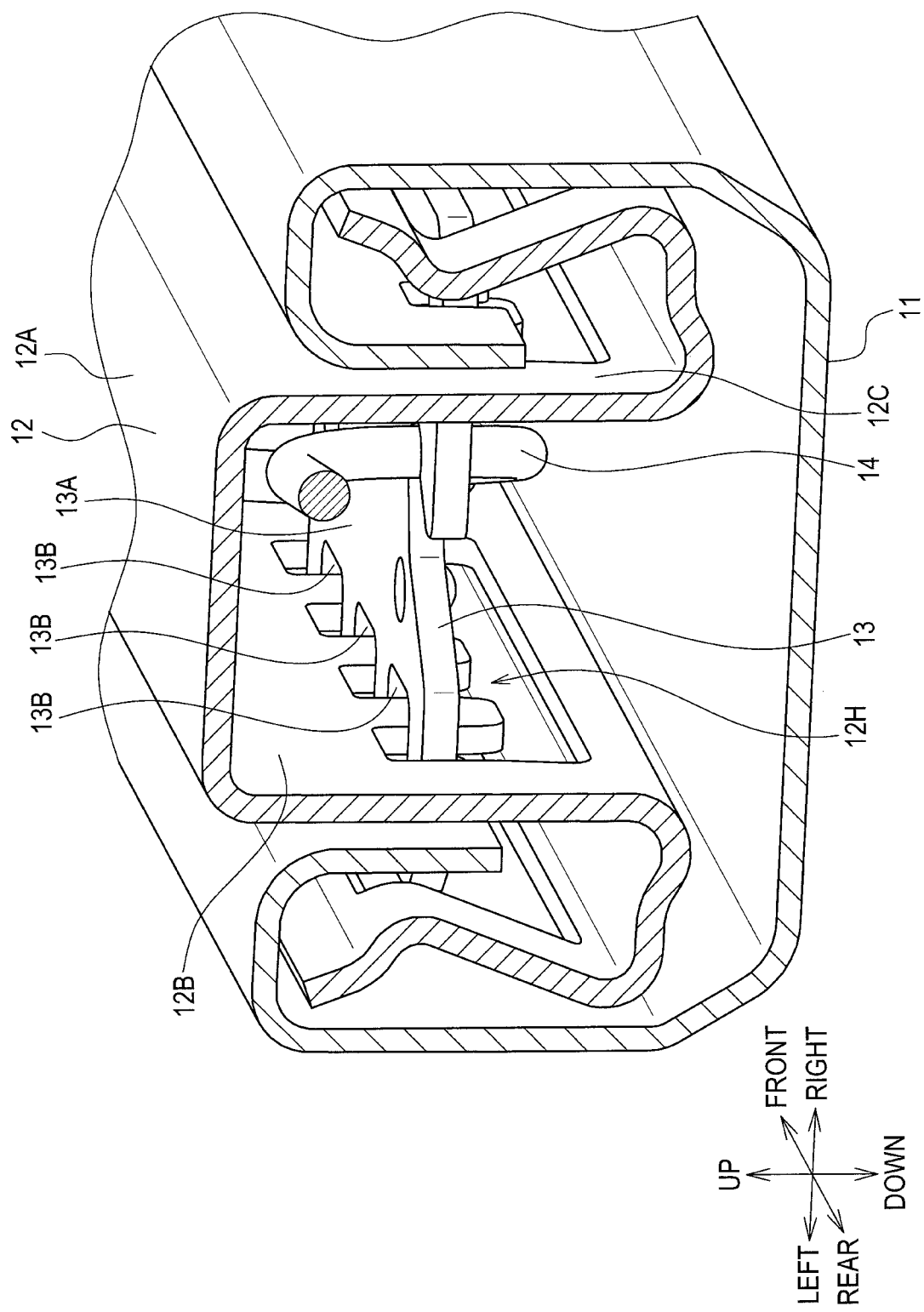
FIG. 5 is a diagram showing an operation of a lock plate of the first embodiment.

The lock plate 13, as shown in FIG. 5, is held by the movable rail 12, and is slidable together with the movable rail 12 relative to the fixed rail 11. The lock plate 13 is displaceable relative to the movable rail 12 in a direction (up-down direction in the present embodiment) substantially orthogonal to the sliding direction.

Figure 6:
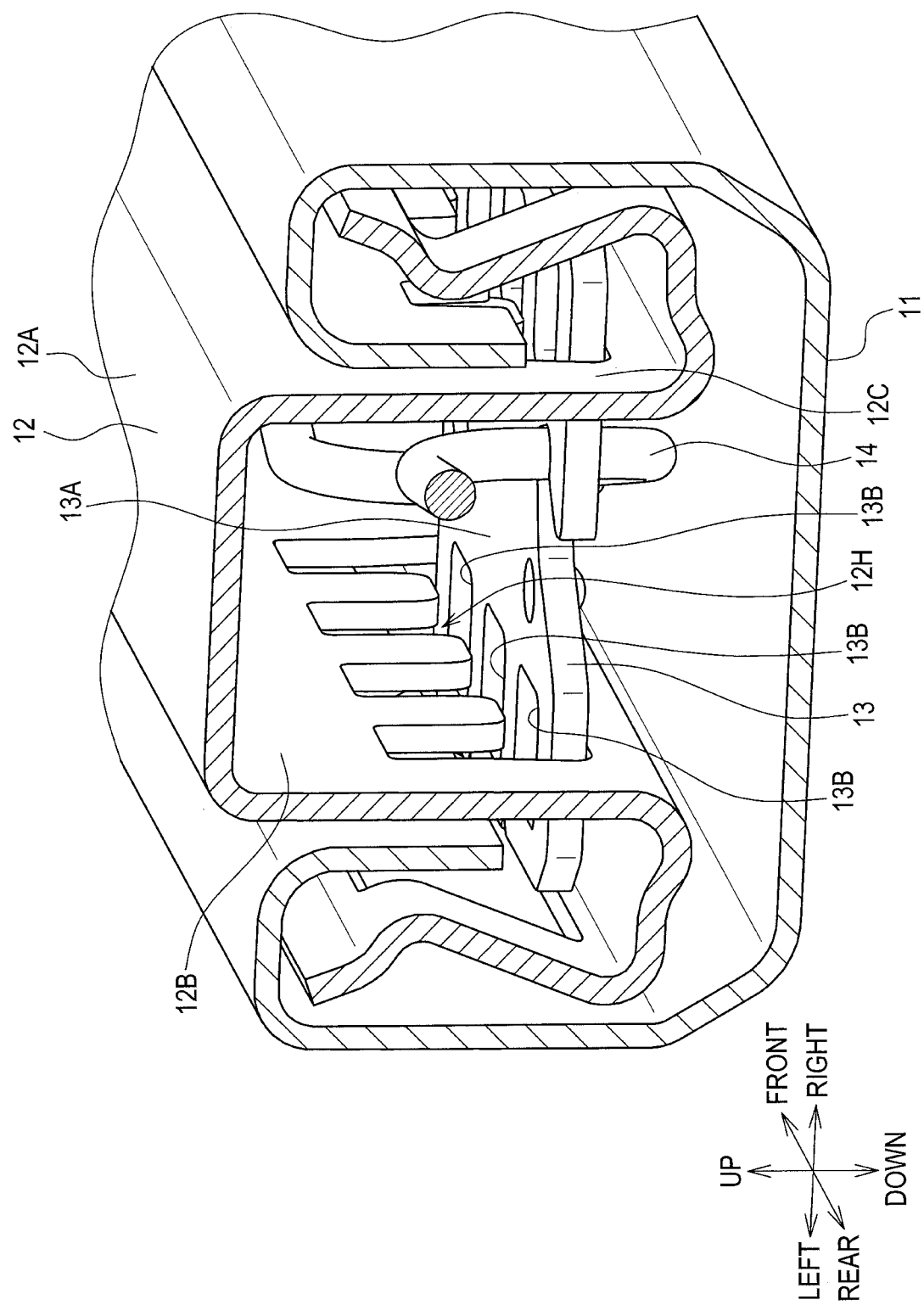
FIG. 6 is a diagram showing an operation of the lock plate of the first embodiment.

Specifically, the lock plate 13 is displaceable between a locking position (see FIG. 5) and an unlocking position (see FIG. 6). The lock plate 13 is a planar member having a plate surface 13A that intersects a displacement direction (up-down direction, in the present embodiment) of the lock plate 13.

The locking position is a position where the lock plate 13 engages with the fixed rail 11 and restricts a sliding movement of the movable rail 12. The unlocking position is a position where restriction of the sliding movement is released and the movable rail 12 is slidable. In other words, the lock plate 13 is one example of a locking member.

Specifically, the lock plate 13 is provided with through holes 13B. The protrusions of the comb portions 11C and the protrusions of the comb portions 12H, 12J can penetrate the through holes 13B. When the lock plate 13 is in the locking position (see FIG. 5), some of the protrusions of the comb portions 11C and the protrusions of the comb portions 12H, 12J penetrate the through holes 13B.

When the lock plate 13 is displaced downward from the locking position to the unlocking position (see FIG. 6), the lock plate 13 is spaced apart from the comb portions 11C and the comb portions 12H, 12J. Therefore, the movable rail 12 is slidable relative to the fixed rail 11.

<Overview of Spring Member and Release Lever>

Figure 7:
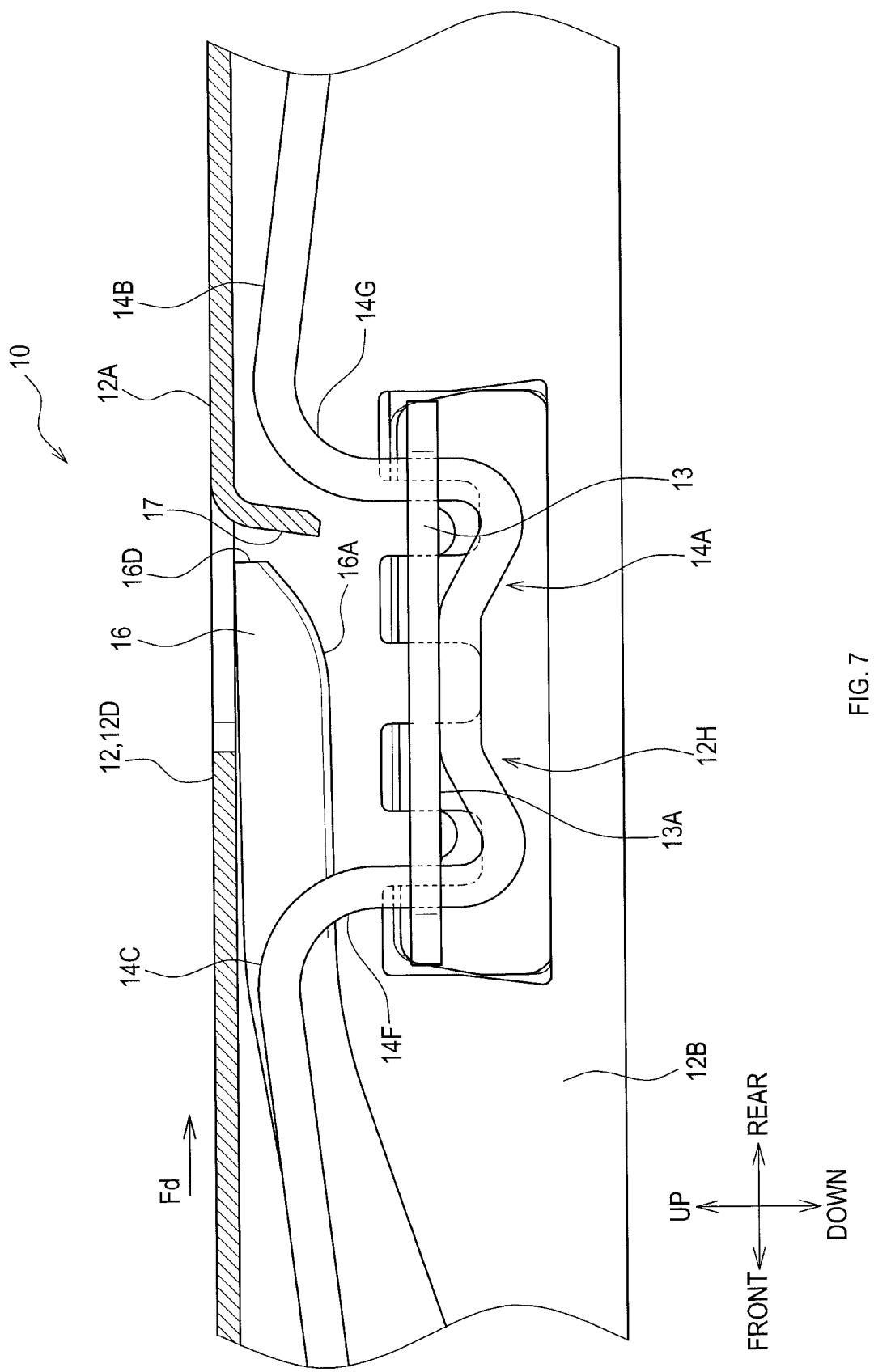
FIG. 7 is a diagram showing a main part of the sliding device of the first embodiment.

The spring member 14, as shown in FIG. 7, provides an elastic force (hereinafter, referred to as retaining force) to retain the lock plate 13 in the locking position. The spring member 14 applies the retaining force to the plate surface 13A of the lock plate 13.

The spring member 14 of the present embodiment applies the retaining force to one, on the unlocking position side, of two upper and lower plate surfaces 13A provided on the lock plate 13. In other words, the spring member 14 applies an upward elastic force to the lower plate surface of the lock plate 13.

The release lever 16 is inserted to the movable rail 12, that is, inserted into the rail body 12D to extend along the longitudinal direction of the movable rail 12, and displaces the lock plate 13 from the locking position to the unlocking position.

The release lever 16 is displaced from its initial position (position shown in FIG. 7) to a release position in response to receiving an operation force. The release lever 16 in the release position applies the operation force to the lock plate 13 to displace the lock plate 13 to the unlocking position.

The initial position is, as shown in FIG. 7, a position where the release lever 16 is spaced apart from the lock plate 13 in the locking position, or a position where the lock plate 13 in the locking position is in contact with the release lever 16.

The release position is a position displaced from the initial position to the unlocking position side (lower side in the present embodiment). In the present embodiment, the release lever 16 in the release position contacts the lock plate 13 from the locking position side (upper side in the present embodiment).

<Detail of Spring Member>

Figure 8:
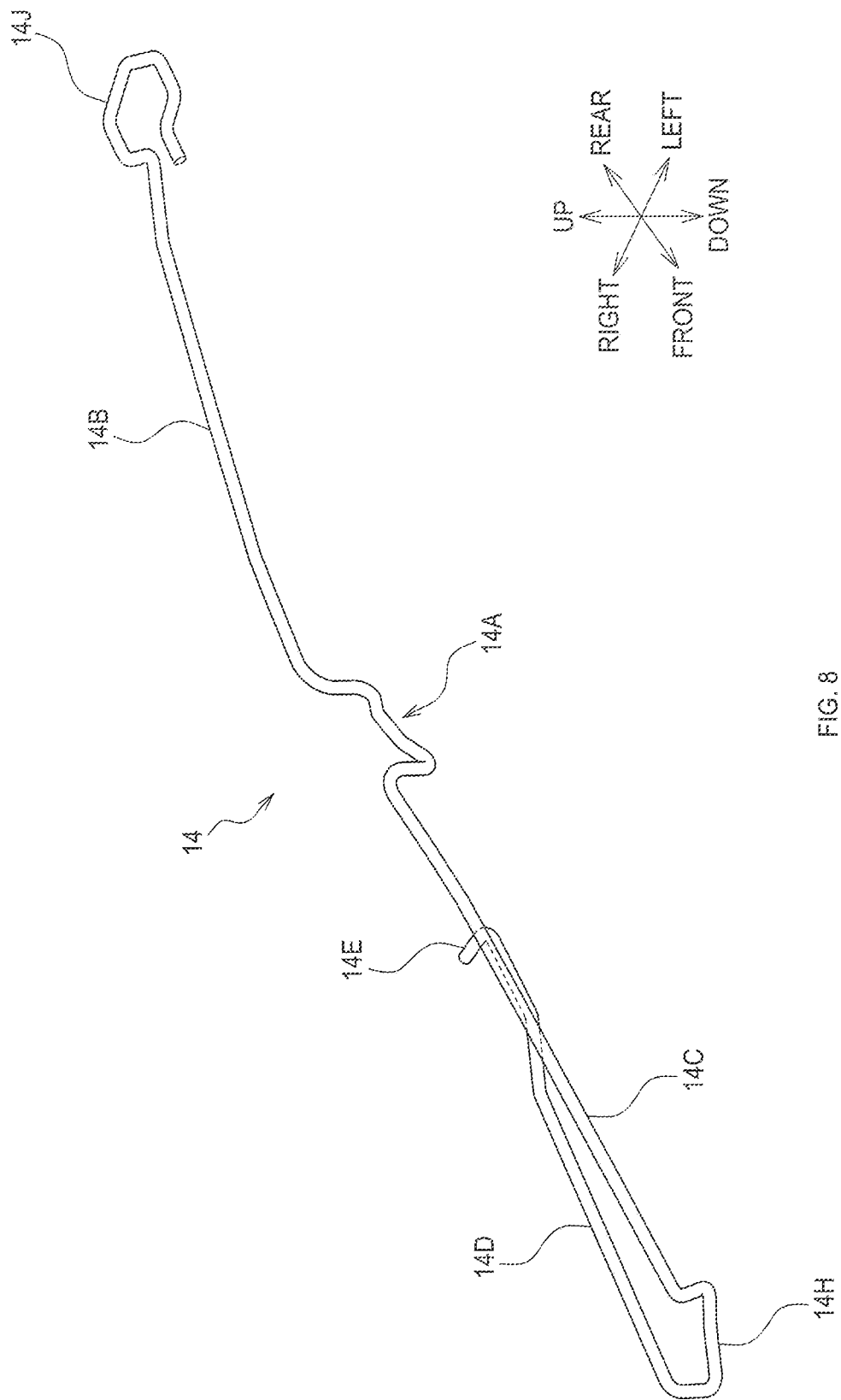
FIG. 8 is a diagram showing a spring member of the first embodiment.

The spring member 14 comprises a coupling portion 14A, a first spring portion 14B, a second spring portion 14C, and a return spring portion 14D, as shown in FIG. 8. The coupling portion 14A is a portion to which the lock plate 13 is coupled, as shown in FIG. 7.

The first spring portion 14B and the second spring portion 14C form a retention spring that provides the retaining force. As shown in FIG. 8, the first spring portion 14B extends from the coupling portion 14A in one direction in the longitudinal direction of the movable rail 12, and a leading end 14J of the first spring portion 14B in the extending direction is secured to the movable rail 12.

The second spring portion 14C extends from the coupling portion 14A in the other direction in the longitudinal direction of the movable rail 12, and a leading end 14H of the second spring portion 14C in the extending direction is secured to the movable rail 12. The first spring portion 14B and the second spring portion 14C are coupled to each other via portions 14F, 14G, as shown in FIG. 7.

The portion 14G couples the coupling portion 14A to the first spring portion 14B. The portion 14F couples the coupling portion 14A to the second spring portion 14C. The portions 14F, 14G extend in the displacement direction (up-down direction in the present embodiment) of the lock plate 13.

In the present embodiment, the portions 14F, 14G penetrate the lock plate 13 in a thickness direction thereof, and a substantially central portion of the coupling portion 14A is in contact with the lock plate 13 from the unlocking position side (lower side in the present embodiment).

The portion 14F and the portion 14G are on a diagonal line of the lock plate 13 that is formed into a substantially rectangular plate. Therefore, a contact portion between the coupling portion 14A and the lock plate 13 is substantially parallel to the diagonal line of the lock plate 13.

The return spring portion 14D provides an elastic force to retain the release lever 16 in its initial position and also to return the release lever 16 located in the release position to the initial position. In other words, the spring member 14 applies to the release lever 16 an elastic force Fs (see FIG. 10) to displace the release lever 16 to the initial position.

Figure 9:
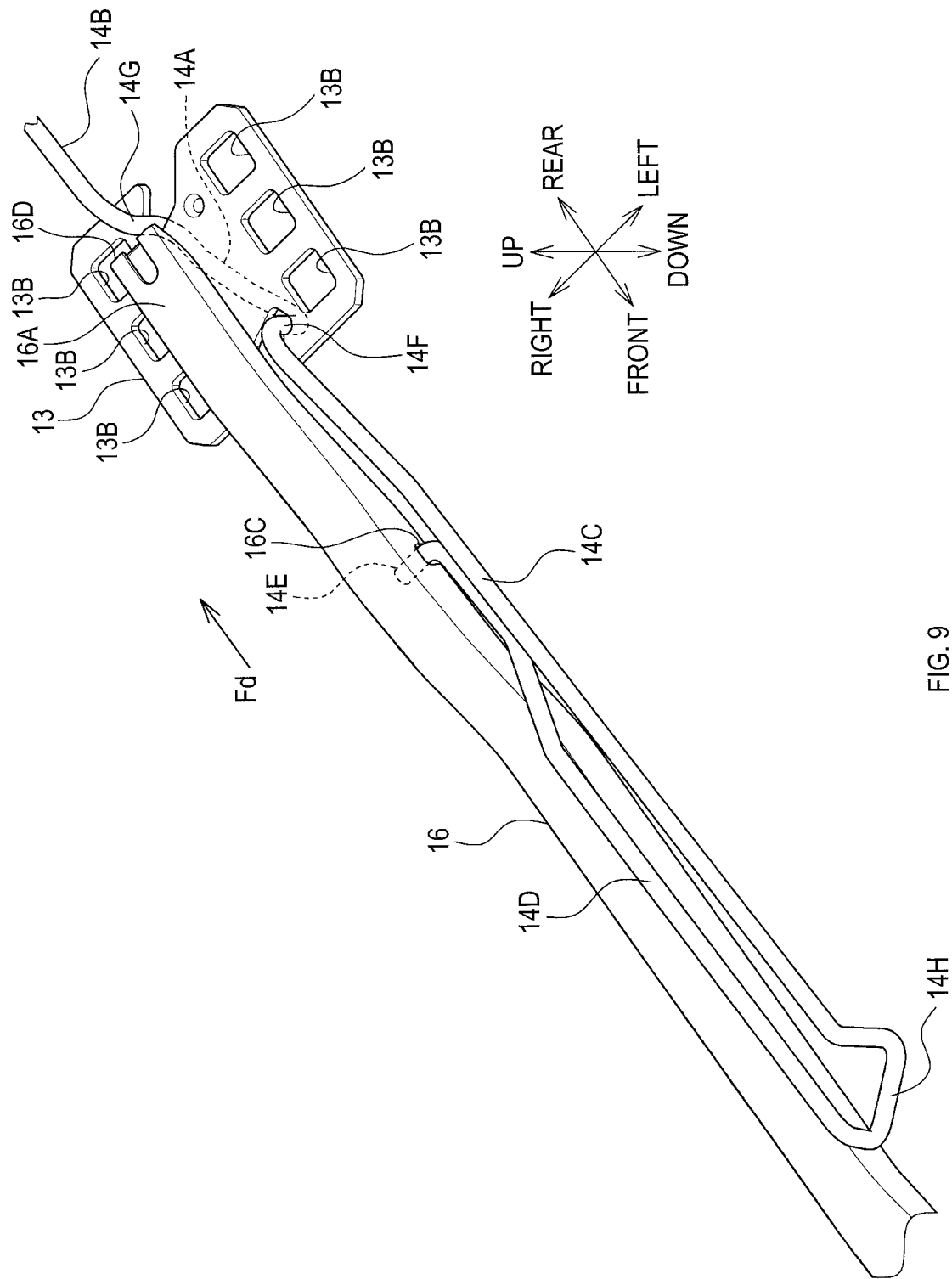
FIG. 9 is a diagram showing the spring member and the lock plate of the first embodiment.

Specifically, the return spring portion 14D extends in a direction substantially the same as the release lever 16, as shown in FIG. 9. A locked portion 14E is provided at a leading end of the return spring portion 14D in an extending direction thereof.

The locked portion 14E protrudes from the return spring portion 14D in a direction that intersects the extending direction of the return spring portion 14D (see FIG. 8), and is locked into a locking portion 16C (see FIG. 9) provided in the release lever 16.

In the present embodiment, the spring member 14 is a one-piece article in which the coupling portion 14A (including the portions 14F, 14G), the first spring portion 14B, the second spring portion 14C, and the return spring portion 14D (including the locked portion 14E) are formed by bending one metal wire rod into a specific shape.

<Detail of Release Lever>

Figure 10:
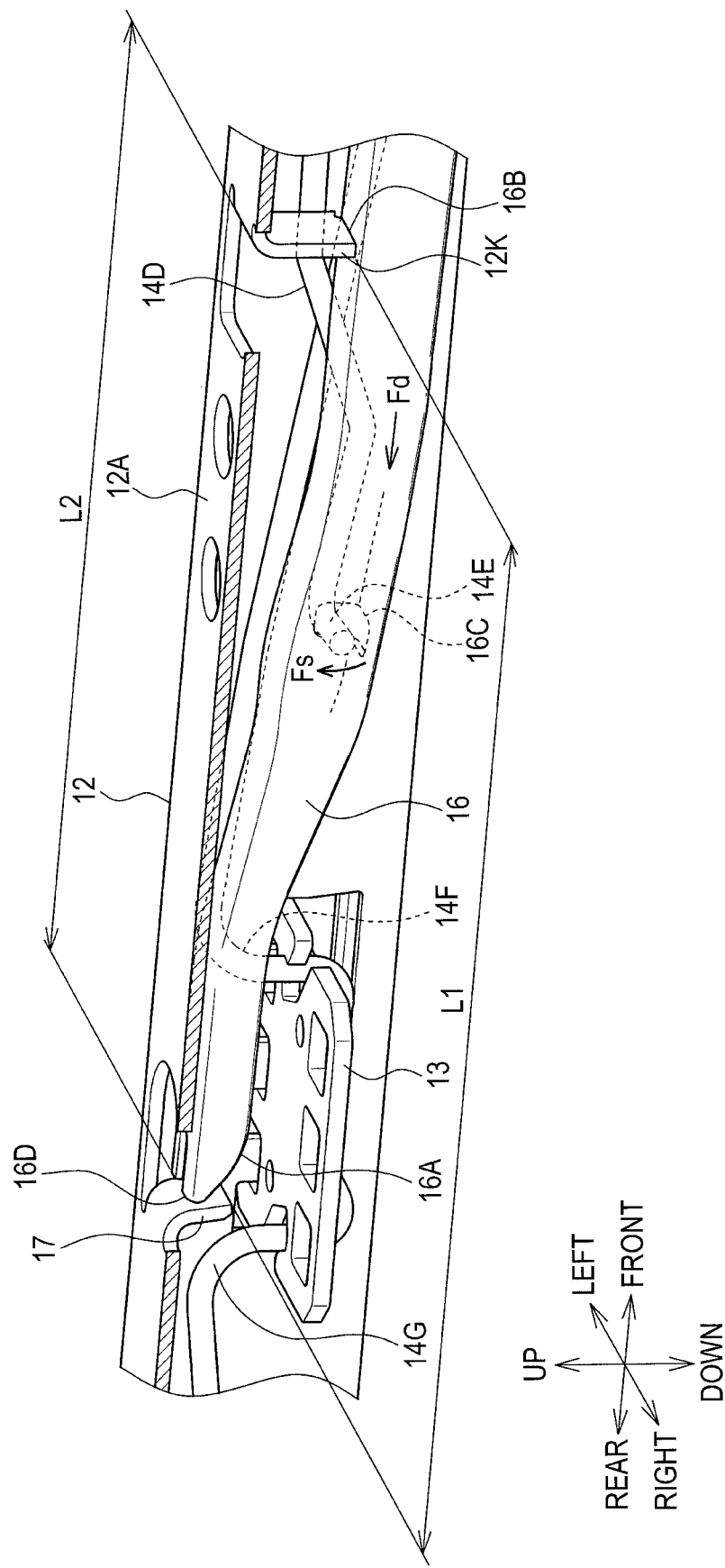
FIG. 10 is a diagram showing a fixing structure of a second spring portion and the movable rail of the first embodiment.

The release lever 16 is pivotally displaceable from the initial position (see FIG. 7) to the release position (downward in the present embodiment) in response to receiving an operation force. As shown in FIG. 10, a pressing portion 16A is provided on a leading end of release lever 16.

When the release lever 16 is in the release position, the pressing portion 16A is in contact with the lock plate 13. In other words, when the release lever 16 is in the release position, the pressing portion 16A applies the operation force to the lock plate 13 to displace the lock plate 13 to the unlocking position.

A supporting projection 12K is provided on an inner wall of the movable rail 12. The supporting projection 12K contacts the release lever 16 from an opposite side of the locked portion 14E relative to the release lever 16 to form a pivot center of the release lever 16.

Specifically, the supporting projection 12K protrudes downward from the top panel 12A to support the pivot center of the release lever 16. The locked portion 14E is provided on a lower surface of the release lever 16, and the contact portion 16B that contacts the supporting projection 12K is located on an upper surface of the release lever 16.

The release lever 16 receives the elastic force Fs from the return spring portion 14D toward the initial position (upward in the present embodiment). Thus, the release lever 16 is always pressed against the supporting projection 12K.

Accordingly, contact between the release lever 16 and the supporting projection 12K is maintained.

The locked portion 14E is locked in the locking portion 16C. Thus, a displacement of the release lever 16 in the longitudinal direction of the movable rail 12 is restricted. As a result, the release lever 16 can pivot around the contact portion 16B without being displaced in the longitudinal direction.

Moreover, the locking portion 16C is displaced toward the pressing portion 16A relative to the contact portion 16B. Thus, the elastic force Fs of the return spring portion 14D applies to the release lever 16 a moment to pivot the release lever 16 toward the initial position. The supporting projection 12K is formed by a cut and raised piece produced by cutting and raising part of the movable rail 12.

2.2 Displacement Restriction of Release Lever

As shown in FIG. 7, a restrictor 17 is provided on the movable rail 12 of the present embodiment. The restrictor 17 restricts the displacement of the release lever 16 in a load direction Fd in excess of a predefined length.

The load direction Fd is substantially parallel to the longitudinal direction of the movable rail 12, which is a direction toward the lock plate 13. The load direction Fd of the present embodiment is a direction from front to rear.

The restrictor 17, as shown in FIG. 10, is formed by a protrusion that protrudes from an outer edge of a through hole provided on an inner wall surface of the movable rail 12 toward the lock plate 13. The protrusion extends from a base end of the restrictor 17 to a lower end of the restrictor 17. The restrictor 17 of the present embodiment is formed by a cut and raised piece obtained by cutting and raising part of the top panel 12A.

The restrictor 17 is provided in a position spaced apart from a leading end 16D of the release lever 16. Thus, a length L1 from the supporting projection 12K to the restrictor 17 is set to be larger than a length L2 from the supporting projection 12K to the leading end 16D of the release lever 16.

Therefore, when the release lever 16 is displaced in the load direction Fd, the restrictor 17 is in contact with the leading end 16D of the release lever 16 to restrict the displacement of the release lever 16. In other words, the restrictor 17 is located on an opposite side of the supporting projection 12K across an arc-shaped locus drawn by the leading end 16D when the release lever 16 pivots.

3. Characteristics of Sliding Device of Present Embodiment

When a large force in the load direction Fd (hereinafter, referred to as load F) is applied to the release lever 16, the locked portion 14E of the spring member 14 may come off from the locking portion 16C of the release lever 16, and the release lever 16 may be displaced in the load direction Fd.

In the sliding device 10 of the present embodiment, the portion 14G of the spring member 14 is located in a position displaced from the restrictor 17 in the load direction Fd and facing the leading end 16D of the release lever 16, as shown in FIGS. 7 and 9.

Figure 11:
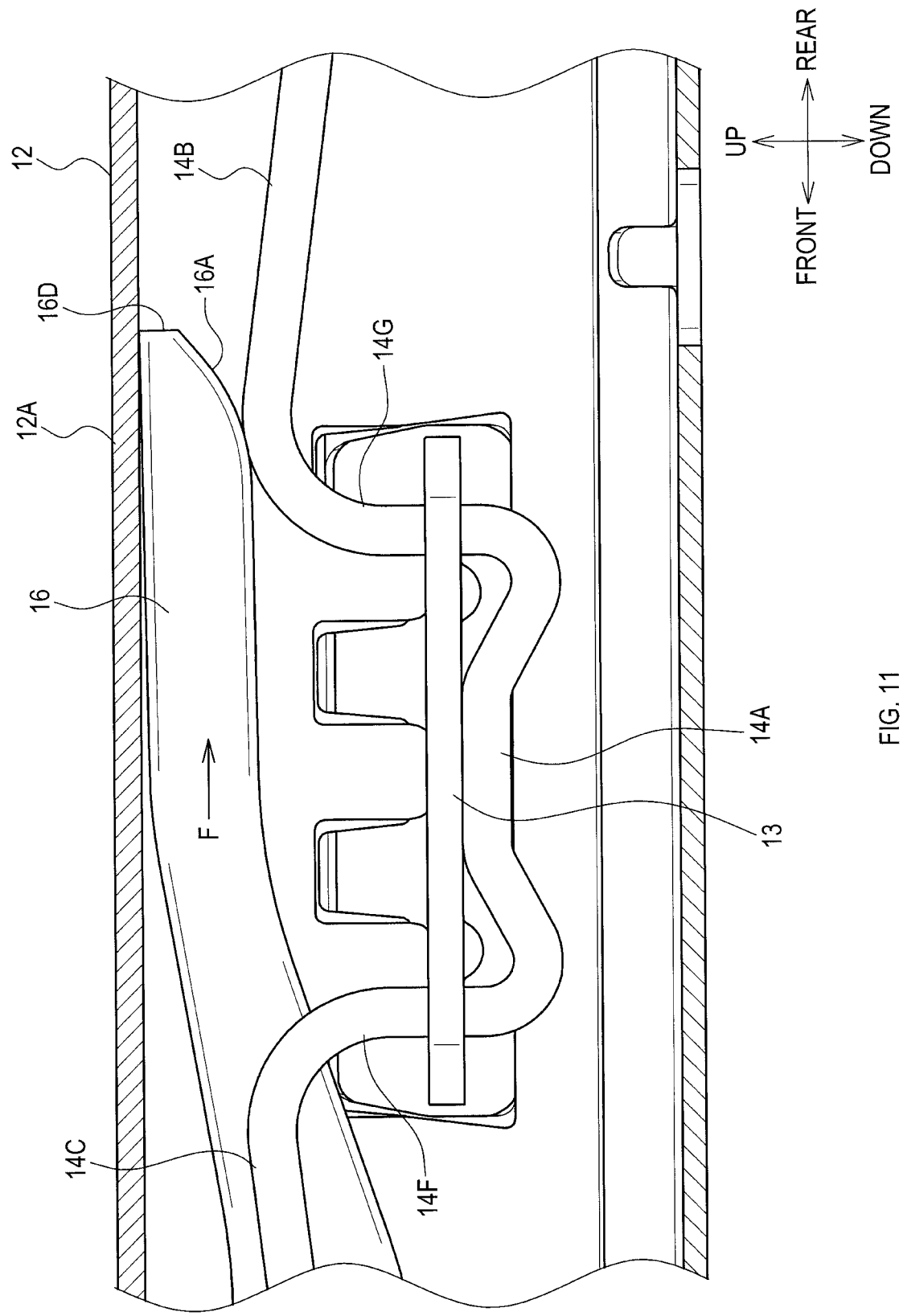
FIG. 11 is a diagram showing the sliding device without a restrictor.

Thus, in a case in which the restrictor 17 is not provided, the release lever 16 may be largely displaced in the load direction Fd due to the load F, as shown in FIG. 11.

Specifically, the release lever 16 is displaced in the load direction Fd so that the leading end 16D or the pressing portion 16A contacts the portion 14G and the release lever 16 bites between the first spring portion 14B and the top panel 12A.

Since the spring member 14 (especially, the coupling portion 14A) is displaced toward the unlocking position, the lock plate 13 is displaced from the locking position to the unlocking position while the pressing portion 16A is spaced apart from the lock plate 13.

In contrast, in the sliding device 10 of the present embodiment, when the release lever 16 is displaced in the load direction Fd due to the load F, the release lever 16 contacts the restrictor 17. Thus, a large displacement of the release lever 16 in the load direction Fd is inhibited.

Accordingly, a displacement of the lock plate 13 from the locking position to the unlocking position due to a large displacement of the release lever 16 in the load direction Fd can be inhibited. Further, even if the large load F is applied to the release lever 16, the displacement of the lock plate 13 from the locking position to the unlocking position can be inhibited.

Also, an assembly worker or an assembly robot (hereinafter, referred to as operator), when assembling the sliding device 10 while inserting the release lever 16 in the load direction Fd, can be restricted from inserting the release lever 16 more than necessary. Accordingly, assembly failure of sliding device 10 can be inhibited.

A phenomenon that the lock plate 13 is displaced from the locking position to the unlocking position is not limited to the aforementioned configuration, that is, the configuration in which the portion 14G of the spring member 14 faces the leading end 16D of the release lever 16.

Figure 12:
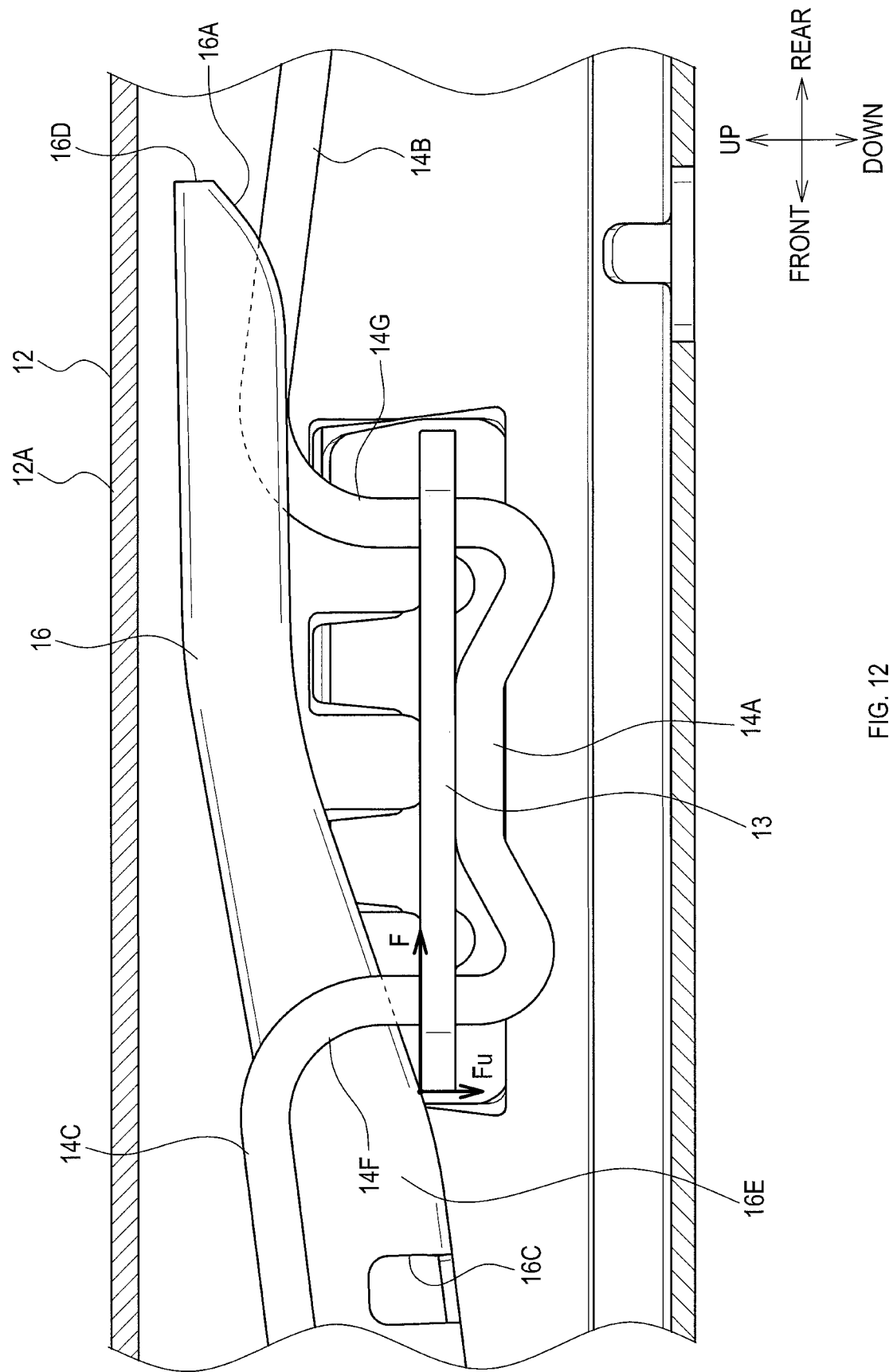
FIG. 12 is a diagram showing the sliding device without a restrictor.

Specifically, for example, the phenomenon that the lock plate 13 is displaced from the locking position to the unlocking position can also occur in a configuration shown in FIG. 12.

The configuration shown in FIG. 12 is "a configuration in which a portion 16E of the release lever 16 is located in a position displaced from the restrictor 17 in a direction opposite to the load direction Fd and facing the lock plate 13, and the portion 16E extends from the unlocking position to the locking position while tilting relative to the load direction Fd."

In this configuration, due to the tilted portion 16E, a large displacement of the release lever 16 in the load direction Fd generates a force Fu to displace the lock plate 13 from the locking position to the unlocking position in a contact portion between the portion 16E and the lock plate 13.

In the configuration shown in FIG. 12, the first spring portion 14B and the portion 14G are displaced in a left-right direction relative to the release lever 16. Thus, the release lever 16 does not interfere with the spring member 14. In other words, an example shown in FIG. 12 is an example in which the displacement of the release lever 16 directly displaces the lock plate 13.

In the present embodiment, when the restrictor 17 is provided in a position spaced apart from the leading end 16D of the release lever 16 and the release lever 16 is displaced in the load direction Fd, the restrictor 17 and the leading end 16D of the release lever 16 contact each other and the displacement of the release lever 16 is restricted.

This can inhibit interference between the release lever 16 and the restrictor 17 when the release lever 16 pivots, that is, when the user operates the release lever 16.

In the present embodiment, the length L1 from the supporting projection 12K to the restrictor 17 is larger than the length L2 from the supporting projection 12K to the leading end 16D) of the release lever 16. This can reliably inhibit interference between the release lever 16 and the restrictor 17 when the release lever 16 pivots, that is, when the user operates the release lever 16.

When the release lever 16 is displaced in the load direction Fd, the release lever 16 is displaced so as to be guided by the top panel 12A. The restrictor 17 of the present embodiment is provided on the top panel 12A.

This allows reliable contact between the restrictor 17 and the release lever 16 when the release lever 16 is displaced in the load direction Fd. Accordingly, in the present embodiment, the displacement of the release lever 16, that is, the displacement of the lock plate 13 can be reliably inhibited.

The restrictor 17 of the present embodiment is formed by a cut and raised piece obtained by cutting and raising part of the top panel 12A. Thus, as compared to a case in which the restrictor 17 is formed by a cut and raised piece obtained by cutting and raising part of the side panel 12B or the side panel 12C, reduction of rigidity of the movable rail 12 can be inhibited.

Specifically, the release lever 16 is separated from the side panels 12B, 12C by a gap, while the release lever 16 is in sliding contact with the top panel 12A. Therefore, in a case in which the restrictor 17 is formed by cutting and raising part of the side panels 12B, 12C, a through hole generated during the cutting and raising work becomes large as compared to the case in which the restrictor 17 is formed by cutting and raising part of the top panel 12A.

In the case in which the restrictor 17 is formed by cutting and raising part of the top panel 12A, a through hole generated during the cutting and raising work becomes small as compared to the case in which the restrictor 17 is formed by cutting and raising part of the side panels 12B, 12C. Thus, reduction of rigidity of the movable rail 12 can be inhibited.

Second Embodiment

Figure 13:
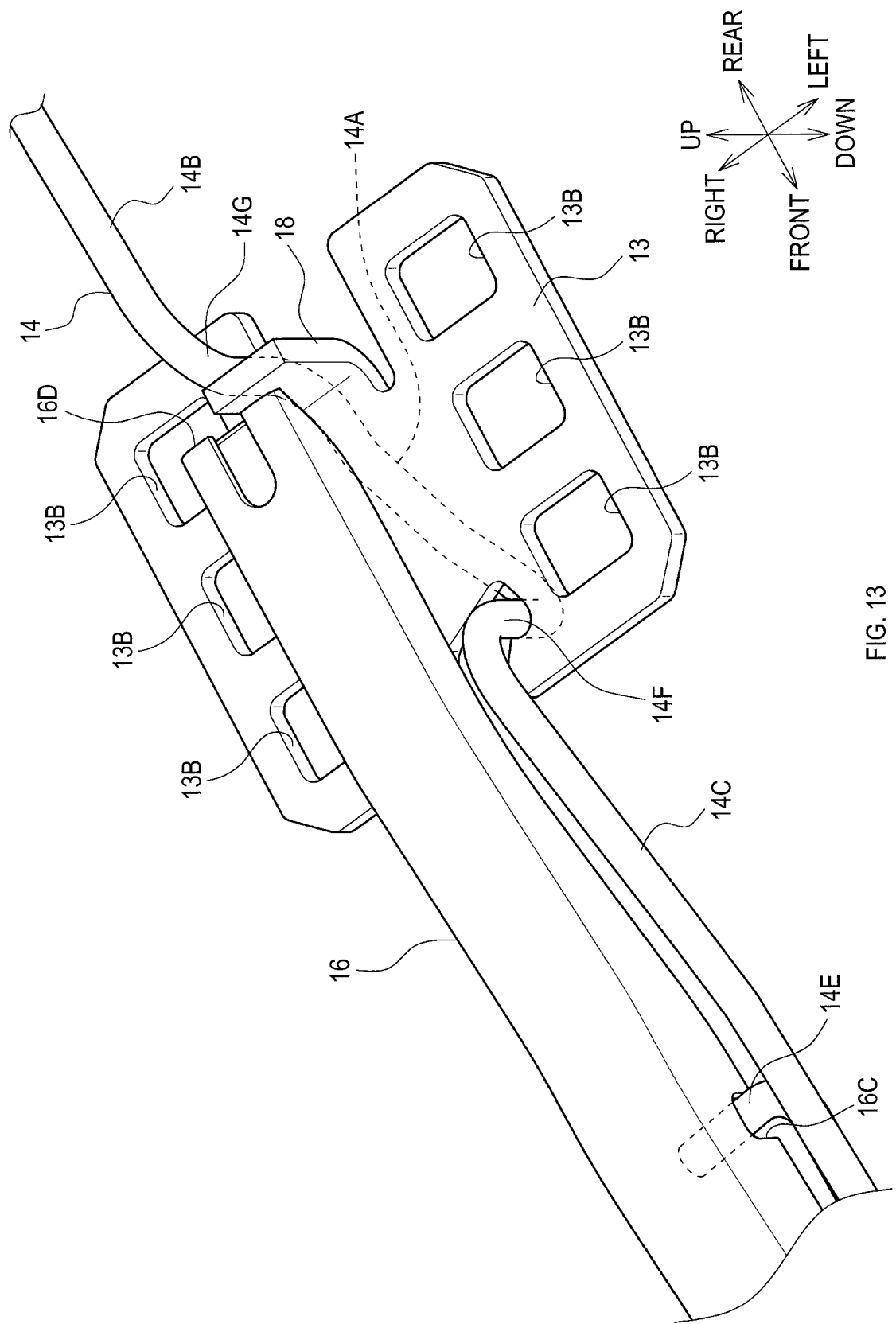
FIG. 13 is a diagram showing a main part of a sliding device of a second embodiment.

The restrictor 17 of the aforementioned embodiment is provided on the movable rail 12. In contrast, a restrictor 18 of the present embodiment is provided on the lock plate 13, as shown in FIG. 13. The restrictor 18 differs from the restrictor 17 mainly in the portion where the restrictor 18 is provided.

The restrictor 18 is provided on the lock plate 13, and thus the direction in which the restrictor 18 protrudes is opposite of the direction in which the restrictor 17 protrudes. Constituent elements that are identical to the constituent elements in the aforementioned embodiment are labeled with the same reference numerals as in the aforementioned embodiment. Thus, overlapping explanations thereof are omitted in the present embodiment.

Other Embodiments

In the aforementioned embodiments, the spring member 14 is a one-piece article in which the first spring portion 14B, the second spring portion 14C, the coupling portion 14A, and the return spring portion 14D are formed by bending one metal wire rod into a specific shape. However, the present disclosure is not limited to this configuration. That is, in the present disclosure, for example, the return spring portion 14D may be separated from the other portions.

In the aforementioned first embodiment, the restrictor 17 is provided on the top panel 12A, and the restrictor 17 is formed by cutting and raising part of the top panel 12A. However, the present disclosure is not limited to this configuration.

For example, the restrictor 17 may be provided on the side panels 12B, 12C, a member that forms the restrictor 17 may be fixed to the movable rail 12 by welding, or coining may be applied to the top panel 12A to produce the protruding restrictor 17.

In the aforementioned embodiments, the spring member 14 and the lock plate 13 are separate members. However, the present disclosure is not limited to this configuration. For example, the spring member 14 and the lock plate 13 may be integrated. The lock plate may be formed by a wire rod.

In the aforementioned embodiments, the restrictors 17, 18 are provided in positions spaced apart from the leading end 16D of the release lever 16. However, the present disclosure is not limited to this configuration. For example, the restrictor 18 may be in contact with the leading end 16D of the release lever 16 all the time.

In the aforementioned embodiments, the portion 14G of the spring member 14 is located on an opposite side of the leading end 16D of the release lever 16. However, the present disclosure is not limited to this configuration. For example, as shown in FIG. 12, the portion 14G does not have to be located on an opposite side of the leading end 16D.

In the aforementioned embodiments, the locked portion 14E is provided on the return spring portion 14D, the supporting projection 12K is provided on the movable rail 12, and the locked portion 14E applies to the release lever 16 the elastic force to return the release lever 16 to the initial position, and restricts the displacement of the release lever 16 in the load direction Fd. However, the present disclosure is not limited to this configuration.

In the aforementioned embodiments, the length L1 from the supporting projection 12K to the restrictors 17, 18 is larger than the length L2 from the supporting projection 12K to the leading end 16D of the release lever 16. However, the present disclosure is not limited to this configuration.

In the aforementioned embodiments, the vehicle seat of the present disclosure is applied to an automobile. However, the present disclosure is not limited to this configuration. For example, the present disclosure may be utilized for seats used in vehicles such as railway vehicles, vessels, and aircrafts, as well as for built-in seats used in theaters and homes.

Further, the present disclosure may be embodied in various forms as long as the gist of the disclosure described in the above embodiments is met, and is not limited to the above embodiments. Thus, at least two of the above embodiments may be combined together, or any of the constituent elements shown in the drawings and/or any of the constituent elements described with reference numerals assigned thereto, in the above embodiments, may not be employed.

What is claimed is:

1. A sliding device operable to be used with a seat body of a vehicle seat, the sliding device comprising:
   a fixed rail fixable to a vehicle;
   a movable rail slidably attached to the fixed rail, the movable rail comprising:
      a strip-shaped top panel portion adopted for attachment of the seat body; and
      strip-shaped side panel portions respectively provided on a first end of the top panel portion and a second end of the top panel portion in a width direction of the top panel portion and facing each other;
   a locking member displaceable between a locking position and an unlocking position, a sliding movement of the movable rail being restricted in the locking position, and restriction of the sliding movement being released in the unlocking position;

a retention spring configured to apply to the locking member a retaining force to retain the locking member in the locking position;

a release lever configured to displace the locking member to the unlocking position, the release lever extending toward the locking member substantially along a longitudinal direction of the movable rail, and the release lever being configured to pivotally displace between a release position and an initial position, the release position being a position in which the release lever is in contact with the locking member for pressing the locking member downward to displace the locking member to the unlocking position, and the initial position being a position in which the release lever is spaced apart from the locking member;

a return spring portion configured to retain the release lever in the initial position and apply to the release lever an elastic force to return the release lever located in the release position to the initial position; and a restrictor configured to restrict a displacement of the release lever in excess of a predefined length toward the locking member in a load direction substantially parallel to the longitudinal direction of the movable rail, the restrictor being formed by a protrusion that protrudes from an outer edge of a through hole provided on the top panel portion toward the locking member, wherein a rear end of the release lever is positioned overlappingly below the through hole when the release lever is located in the initial position, the release lever faces the restrictor substantially in the load direction when the release lever is located in the initial position, the locking member has a plate shape, an upper plate surface, and a lower plate surface, and the retention spring is configured to apply an upward elastic force to the lower plate surface of the locking member.

2. The sliding device according to claim 1, wherein the restrictor is tilted toward the release lever located in the initial position.

3. The sliding device according to claim 1, wherein
the restrictor is provided in a position spaced apart from the rear end of the release lever, and
when the release lever is displaced toward the locking member, the restrictor contacts the rear end of the release lever to restrict the displacement of the release lever.

4. The sliding device according to claim 1, wherein a part of the retention spring is located in a position displaced from the restrictor toward the locking member and facing the rear end of the release lever.

5. The sliding device according to claim 1 comprising:
a locked portion provided on the return spring portion and locked to the release lever; and
a support portion provided on the movable rail and configured to contact the release lever to form a pivot center of the release lever, wherein the locked portion is configured to apply to the release lever the elastic force to return the release lever to the initial position, and restrict the displacement of the release lever toward the locking member.

6. The sliding device according to claim 5, wherein a length from the support portion to the restrictor is larger than a length from the support portion to the rear end of the release lever.

7. The sliding device according to claim 1, further comprising a spring member, wherein the spring member includes the retention spring and the return spring portion.

8. The sliding device according to claim 1, wherein
the fixed rail comprises a fixed-rail-side comb portion,
the movable rail comprises a movable-rail-side comb portion,
the locking member comprises a plurality of through holes, and
a protruding portion of the fixed-rail-side comb portion and a protruding portion of the movable-rail-side comb portion are configured to be engaged with the plurality of through holes of the locking member in the locking position.

9. The sliding device according to claim 1, wherein
the locking member is configured to be displaced upward from the unlocking position to the locking position by an elastic holding force of the retention spring,
the fixed rail comprises a fixed-rail-side comb portion,
the movable rail comprises a movable-rail-side comb portion,
the locking member comprises a plurality of through holes, and
protruding portions of the fixed-rail-side comb portion and protruding portions of the movable-rail-side comb portion are configured to penetrate two or more through holes of the plurality of the through holes as the locking member is displaced upward.

10. The sliding device according to claim 1, wherein the release lever is arranged inside a rail body of the movable rail, the rail body being defined by the top panel portion and the side panel portions.

11. The sliding device according to claim 1, wherein
the retention spring comprises a coupling portion to which the locking member is coupled, and
a substantially central portion of the coupling portion is in contact with the locking member at the lower plate surface of the locking member.

12. The sliding device according to claim 1, wherein
the release lever comprises a pressing portion on the rear end of the release lever, and
the pressing portion is configured, as the release lever is pivotally displaced from the initial position to the release position, to come into contact with the locking member and press the locking member so as to displace the locking member to the unlocking position.

* * * * *